United States Patent [19]

Vaughan et al.

[11] Patent Number: 5,308,813
[45] Date of Patent: May 3, 1994

[54] SELECTIVE DEMETALLATION OF ZEOLITES AND RELATED MATERIALS

[75] Inventors: David E. W. Vaughan, Flemington; Karl G. Strohmaier, Port Murray, both of N.J.

[73] Assignee: Exxon Research & Engineering Company, Florham Park, N.J.

[21] Appl. No.: 11,915

[22] Filed: Feb. 1, 1993

[51] Int. Cl.$^5$ .......................... B01J 29/02; B01J 29/04
[52] U.S. Cl. ......................................... 502/64; 502/60; 502/208; 502/214
[58] Field of Search .................. 502/64, 514, 516, 87, 502/60, 208, 214, 242

[56] References Cited

U.S. PATENT DOCUMENTS

| | | | |
|---|---|---|---|
| 3,213,033 | 10/1965 | Hindin et al. | 502/516 |
| 3,980,586 | 9/1976 | Mitchell | 502/64 |
| 4,734,539 | 3/1988 | Lawlor et al. | 585/739 |
| 4,931,267 | 6/1990 | Vaughan et al. | 423/328 |
| 4,961,836 | 10/1990 | Murphy | 208/111 |

FOREIGN PATENT DOCUMENTS 3182036 7/1988 Japan ................................. 502/514

OTHER PUBLICATIONS

Scherzer, Julius, The Preparation and Characterization of Aluminum-Deficient Zeolites, 1984, Symposium Ser. No. 248, Ch. 10, American Chemical Society.

Primary Examiner—Carl F. Dees
Attorney, Agent, or Firm—Estelle C. Bakun

[57] ABSTRACT

A method for demetallating crystalline molecular sieve materials by removing a transition metal in the sieve framework with a complexing agent.

8 Claims, 3 Drawing Sheets

SELECTIVE DEMETALLATION OF ZEOLITES AND RELATED MATERIALS

BACKGROUND

High silica zeolitic materials are important catalysts by virtue of high stability and controlled acidity. Numerous methods have been developed to dealuminate aluminosilicate zeolites and convert them into high silica analogs, see, for example, Kerr (Amer. Chem. Soc. Symp. Ser. #121, p. 219 (1973)), McDaniel and Maher (Amer. Chem. Soc. Monograph #171, p. 285 (1976)), and Scherzer (Amer. Chem. Soc. Symp. Ser. #248, p. 157 (1984)). More recently, much interest has focused on dealumination using ammonium silicon hexafluoride, see for example, Breck and Skeels (Proc. 6th. Int'l. Zeolite Conf., p. 87, (1984) Butterworks Press) and nonaqueous solvents with $SiCl_4$, [see Rees and Lee (P.C.T. W088/01254 (1988))]. All of these methods suffer from a tendency to non-selective $Al^{3+}$ removal, with selective surface enrichment with silicon or aluminum. Furthermore, they are difficult to control at specific $Al^{3+}$ removal levels, and in some cases significantly damage the pore structure of the zeolite.

SUMMARY OF THE INVENTION

The methods of the present invention are not limited to aluminosilicate zeolites but are applicable to molecular sieves and zeolites in general together with other molecular sieve types, including phosphates, titanates, stannates, zirconates, and analagous materials such as pillared layered structures.

Applicants' invention provides a method for selective element, particularly silicon, enrichment which avoids the drawbacks of the prior art. Applicants have discovered that if a zeolite is made in the transition metal aluminosilicate form, wherein a certain number of tetrahedral framework (T) atoms are replaced by transition metals ($Fe^{+3}$, $Cr^{+3}$, $Zn^{+2}$, etc.), the transition metal is uniformly distributed throughout the T-sites in the structure. By selectively removing the transition metal to create a vacancy, then annealing the product in the presence of a Si source, a material having a high silica/alumina ratio and a uniform distribution of $Al^{3+}$ results. The additional silica is incorporated into the sites previously occupied by the removed transition metal in an ordered manner, affording a material with an even higher silica/alumina ratio. The vacancy can also be filled with other elements not easily substituted into the structure by conventional synthesis methods (e.g., Ti, Zr and Sn). Applicants have discovered that the transition metal can be selectively removed by demetallating a transition metal containing crystalline material with a complexing agent under reaction conditions which do not also remove the $Al^{3+}$ or $Si^{4+}$. The method thus provides means to produce highly ordered high silica alumina ratio zeolites, as illustrated in FIG. 1. As used herein, demetallation refers to the removal of transition metal from a transition metal containing crystalline material, creating vacancies, which may then be filled with another element. In some cases the vacancies, often viewed as "hydroxyl nests" (R. M. Barrer, "Hydrothermal Synthesis," Academic Press, Ch. 6), may be left as reactive sites within the structure. The process may be visualized as shown in FIG. 1.

Zeolites and molecular sieves comprise framework structures in which an oxygen framework is crosslinked by tetrahedrally or octahedrally (or mixtures of both) coordinated highly charged cations. Typically those cations may be mixtures of $IV_{Si}4+$, $IV_{Al}3+$, $IV_P5+$, $(IV_{Si}4+ + VI_{Sn}4+)$, $(IV_{Si}4+ + VI_{Ti}4+)$, $(IV_{Si}4+ + VI_{Zr}4+)$, and numerous other combinations. Framework charge deficiency, created by various cationic substitutions into these framework cation positions, require the presence of charge balancing cations. These may occupy specific "nonframework" "exchange" sites within the open space of the framework and sometimes be very mobile within this space. These exchangeable cations can be readily replaced or removed by numerous methods known in the art and are not the target of this invention. The "framework" cations however are locked into the oxygen network and are difficult to remove or replace. Numerous methods have been developed to control this "framework" composition in molecular sieve materials, either by direct synthesis or by "secondary synthesis," particularly dealumination methods (as described in the Background section of this disclosure). This invention discloses an improved method for manipulating this "framework" composition by utilizing the selective complexing of transition metals by selected complexing agents. The target material is first synthesized so as to contain transition metals in the framework positions of the structure. These will occupy either specific preferred framework sites or randomly replace the established framework cations. On contact with a complexing agent under controlled pH conditions the transition will be selectively "leached" or reacted from the framework leaving a vacancy. This vacancy can then be filled in a concurrent or post-reaction, or merely left as a "hole" in the structure. Clearly too many residual "holes" lead to the collapse of the framework, but their number may be controlled by the initial synthesis of the transition metal form of the structure and the de-metallation reaction conditions (nature of the complex; temperature; pressure; complex concentration; pH; contact time; etc.) so that this problem can be avoided. The important factor is that only the transition metal is removed and the Al and Si are left in the framework.

The present invention is directed to a method for demetallating crystalline molecular sieve materials comprising the steps of:

(a) synthesizing a crystalline molecular sieve material having framework cation positions wherein a transition metal is contained in said framework cation positions;

(b) removing said transition metal from said framework cation positions of said crystalline molecular sieve material by contacting said transition metal containing crystalline material with a complexing agent for a time and at a temperature sufficient to remove said transition metal from said crystalline molecular sieve material;

(c) thermally or hydrothermally annealing said crystalline molecular sieve material having said transition metal removed therefrom.

The process may further comprise adding a source of silicon, zirconium, aluminum, boron, gallium, germanium, phosphorus, titanium, vanadium, manganese and mixtures thereof to said annealing step (c) to increase the amount of silicon, zirconium, titanium, aluminum, boron, gallium, germanium, vanadium, manganese, phosphorus, and mixtures thereof incorporated into the final demetallated crystalline molecular sieve material.

The materials prepared in accordance with the present invention can be used as catalysts in fluid catalytic cracking, hydrocracking, reforming, and other hydrocarbon conversion processes, or as selective sorbents and ion exchangers. The process is especially useful for the property enhancement (i.e., stability, reactivity) of zeolites subjected to severe environments such as steam and $H_2S$ and for the preparation of hydrophobic selective sorbents.

DETAILED DESCRIPTION OF THE INVENTION

Figure 1:
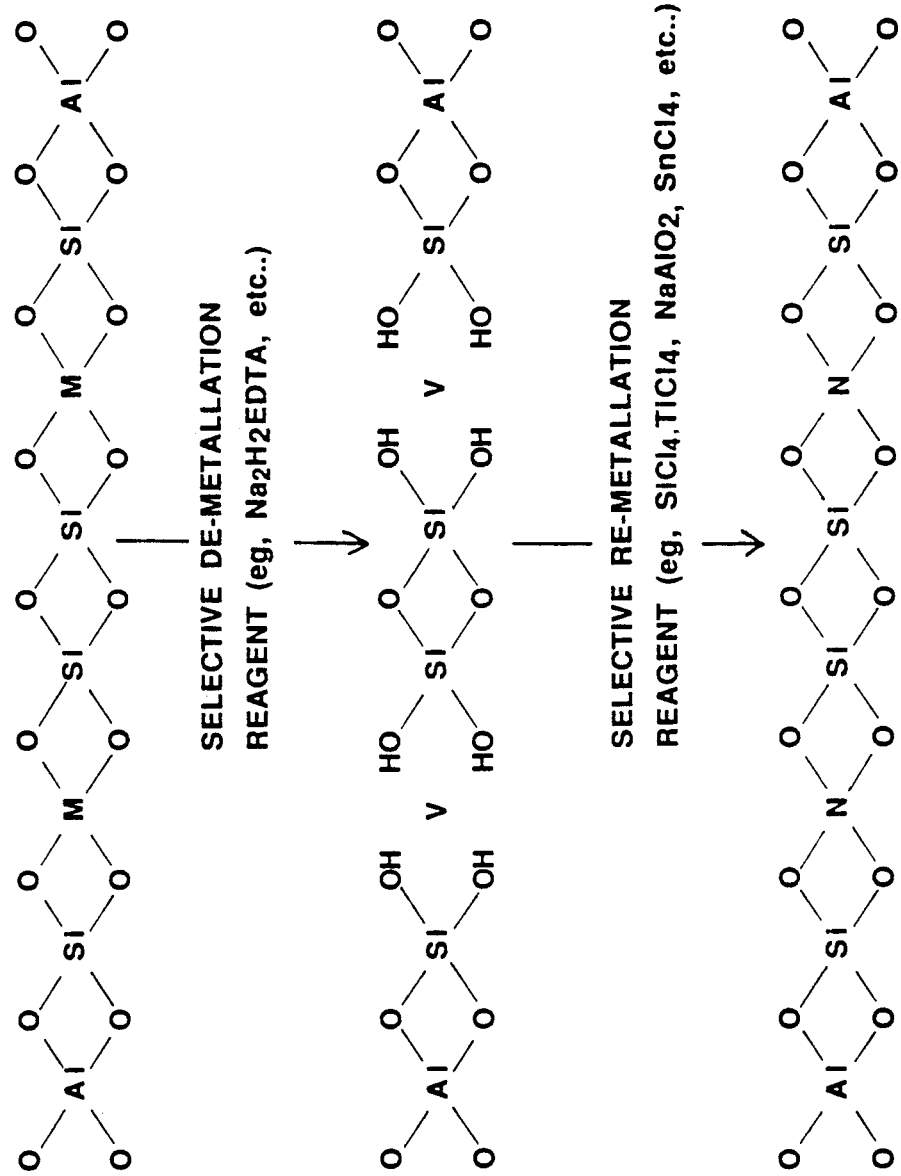
FIG. 1 illustrates schematically the process of this invention wherein a transition metal M is selectively removed from a framework site by complexation, followed by vacancy (V) filling with another element N.

The present invention is a general method which can be applied to a wide range of materials containing transition metals. The transition metals which may be selectively removed by the present method include all transition metals. Such transition metals are those elements of the periodic table having partially filled d or f shells. The method is especially useful for removal of iron, nickel, cobalt, chromium, zinc, vanadium, manganese, copper, gallium, and mixtures thereof. The method is especially applicable to transition metal zeolites or porous molecular sieves with the specific purpose of making highly stable selective catalysts and sorbents. Such materials include metal alumina-phosphates, metal silicoalumino phosphates, metallosilicates, metal-stannosilicates, titanosilicates, zirconosilicates etc. The method selectively removes transition metal without effecting the removal of other majority elements which are usually Si, Al, or P.

The transition metal containing material, for example zeolite, may be prepared by methods known to those skilled in the art. See for example U.S. Pat. No. 4,961,836, co-pending U.S. Ser. No.746,263 (U.S. Pat. No. 5,185,138) and Ser. No. 746,264 (U.S. Pat. No. 5,185,137) and Ser. No. 746,265 (U.S. Pat. No. 5,185,136) (now allowed) herein incorporated by reference. Several ferrisilicate zeolite analogs have been described by Ratnasamy and Kumar (Catalysis Today, V. 9, (4), (1991)). The transition metal containing material is then contacted with a complexing agent having a pH above about 3.0 for a time and at a temperature sufficient to effect the desired amount of transition metal removal. Such an amount of time is easily determined by one skilled in the art. An example of a suitable complexing agent is disodium EDTA. The contacting is carried out at a temperature of about 0° C. to about 300° C., a subsequent annealing step heals the structure. The annealing is accomplished by heating and may be carried out in the presence of a compound whose cation can replace the removed transition metal. Alternatively, the annealing step may be carried out as a solution reaction using aqueous or nonaqueous solvents containing dissolved substitutional metals. For example a silicon, zirconium, aluminum, boron, gallium, germanium, phosphorus, vanadium, manganese, titanium compound and mixtures thereof as substitutional metals can be used. Nonlimiting examples of suitable compounds include silicon tetrachloride, tetramethylorthosilane, tetraethylorthosilane, and titanium isopropoxide, tetramethyltitanate, etc. Annealing migrates the added element (Si, Ti, Zr, Al, B, Ga, Ge, P, V, Mn) into vacancies from which transition metal has been removed thereby stabilizing the structure. Such alternate methods are well known in the art as described in, for example, U.S. Pat. Nos. 4,503,023 and 5,098,687 and PCT WO.88.01254.

When applying the present invention to zeolites, a zeolite in a transition metal alumino silicate form is first prepared or obtained, in which the transition metal is uniformly distributed throughout the T sites in the structure. The transition metal is then removed resulting in a higher silica:alumina ratio material having a uniform vacancy distribution. To selectively remove the transition metal without effecting $Al^{3+}$ removal, the transition metal is dealuminated with a complexing agent, having a pH above about 3.0, e.g. disodium EDTA. The complexing agent chosen does not effect $Al^{3+}$ removal. The prior art which uses complexing agents use the acid forms of the complexing agents, leading to $Al^{3+}$ removal (Kerr, Amer. Chem. Soc. Symp. Ser. 121, p 219, (1973); Pickert and Murphy, U.S. Pat. No. 4,961,836). The resultant material of this invention then annealed with an additional supply of $SiO_2$ to fill the sites previously occupied by the transition metal, resulting in a zeolite with a high silica/alumina ratio and uniform $Al^{3+}$ distribution. Such zeolite materials with increased silica/alumina ratio have increased stability in steam and also improved acid site activity making them highly desirable as catalysts by virtue of their steam regenerability, enhanced thermal stability and controlled acidity.

The following examples are illustrative though not limiting.

EXAMPLE 1

A 125 mL acid digestion bomb (Teflon lined) was charged with 2.0 g of FE-FAU (iron substituted faujasite) and 100 mLs of a 5% solution of $Na_2H_2EDTA$. This bomb was mounted on a rotating shelf in a 200° C. oven for seven hours. The product was filtered, washed and dried in a 115° C. oven. The very light tan product was analyzed by ICP-AES using $Li_2B_2O_7/Li_2CO_3$ fusion method to dissolve the sample.

TABLE I

| Sample | % Al | % Si | % Na | % Fe | Si/ Al + Fe | Fe/ Al + Fe | Unit Cell (A) |
|---|---|---|---|---|---|---|---|
| Fe-FAU | 5.61 | 23.5 | 6.94 | 5.45 | 2.74 | 0.32 | 24.646 |
| *Fe-FAU | 7.03 | 31.3 | 5.22 | 0.26 | 4.20 | 0.02 | 24.608 |

The asterisk indicates that the material has undergone demetallation in accordance with the instant invention.

The above data show that almost all of the $Fe^{3+}$ has been removed without removal of any $Al^{3+}$.

EXAMPLE 2

A 125 mL acid digestion bomb (Teflon lined) was charged with 6.0 g of NI-LTL (nickel substituted Linde Type L zeolite), 90 mLs of $H_2O$, 10 g $Na_2H_2EDTA$ and 2.4 g of 50% NaOH. This bomb was placed in a 150° C. oven for 3 days. The product was filtered, washed and dried in a 115° C. oven. The very light green product was analyzed by ICP-AES using the HF/aqua regia method to dissolve the sample, showing almost complete nickel removal without simultaneous removal of $Al^{3+}$.

TABLE II

| Sample | % AL | % Si | % Na | % K | % Ni | Si/Al + Ni | Ni/Al + Ni |
|---|---|---|---|---|---|---|---|
| Ni-LTL | 7.02 | 23.8 | 0 | 11.3 | 4.07 | 2.57 | 0.21 |
| *Ni-LTL | 7.81 | 26.6 | 1.08 | 9.33 | 0.73 | 3.14 | 0.04 |

The asterisk indicates that the material has undergone demetallation in accordance with the instant invention.

EXAMPLE 3

A 125 mL Teflon bottle was charged with 2.0 g of Fe-FAU (deep bed steamed at 550° C./2 hr), 25 mL water and placed in a 90° C. water bath. A total of 0.63 g of H₄EDTA was added over a period of 6 hours (at a rate of 1/6 every hour). The product was filtered, washed with hot distilled water and dried in a 115° C. oven. This is a conventional treatment favored by other researchers (e.g. Kerr). The light tan product was analyzed by ICP-AES using the HF/aqua regia method to dissolve the sample.

TABLE III

| Sample | % AL | % Si | % Na | % Fe | Si/(Al + Fe) | Fe/(Al + Fe) |
|---|---|---|---|---|---|---|
| Fe-FAU | 6.14 | 22.5 | 7.74 | 4.72 | 2.57 | 0.27 |
| *Fe-FAU | 5.77 | 29.9 | 6.23 | 4.37 | 3.64 | 0.27 |

The asterisk indicates that the material has undergone nonselective demetallation using conventional techniques.

This example shows that $Al^{3+}$ and $Fe^{3+}$ have been removed in equal amounts, showing no selectivity for the conventional method using H₄EDTA.

EXAMPLES 4-16

A series of experiments was performed by charging 2.0 grams of various transition metal substituted zeolites and 80-90 mls of a 5% solution of Na₂H₂EDTA to 125 ml acid digestion bombs (Teflon lined). The bombs were mounted on a rotating shelf (14 rpm) in a 200° C. oven for 7-8 hours. The products were filtered, washed with distilled water and dried in a 115° C. oven. The untreated zeolites and their demetallated products were analyzed by ICP-AES to have the following values shown in Table IV.

TABLE IV

| Example | Zeolite | Trans. Metal | % Al | % Si | % K | % Na | % M | Si/Al | Si/(Al + M) | (Na + K)/(Al + M) | M/(Al + M) |
|---|---|---|---|---|---|---|---|---|---|---|---|
| 4 | LTL | Fe | 6.41 | 24.8 | 12.0 | | 5.95 | 3.72 | 2.57 | 0.89 | 0.31 |
| | *LTL | Fe | 7.70 | 30.4 | 10.2 | 1.00 | 2.66 | 3.79 | 3.25 | 0.91 | 0.14 |
| 5 | LTL | Ni | 5.92 | 26.0 | 9.0 | | 11.50 | 4.22 | 2.23 | 0.55 | 0.47 |
| | *LTL | Ni | 7.19 | 33.1 | 9.0 | 0.86 | 0.31 | 4.42 | 4.34 | 0.98 | 0.02 |
| 6 | MAZ | Fe | 5.30 | 27.6 | 0.0 | 6.77 | 5.13 | 5.00 | 3.41 | 1.02 | 0.32 |
| | *MAZ | Fe | 5.71 | 29.7 | 0.0 | 4.74 | 2.28 | 5.00 | 4.19 | 0.82 | 0.16 |
| 7 | MAZ | Ni | 5.89 | 24.2 | 0.0 | 4.70 | 8.82 | 3.95 | 2.34 | 0.55 | 0.41 |
| | *MAZ | Ni | 7.23 | 30.3 | 0.0 | 4.20 | 0.09 | 4.03 | 4.00 | 0.68 | 0.01 |
| 8 | FAU | Fe | 5.40 | 24.7 | 0.0 | 7.42 | 5.91 | 4.39 | 2.87 | 1.05 | 0.35 |
| | *FAU | Fe | 6.91 | 28.4 | 0.0 | 5.18 | 0.14 | 3.95 | 3.91 | 0.87 | 0.01 |
| 9 | LTL | Zn | 4.42 | 26.9 | 14.4 | | 7.31 | 5.85 | 3.47 | 1.33 | 0.41 |
| | *LTL | Zn | 5.78 | 33.3 | 7.3 | 0.71 | 0.06 | 5.53 | 5.51 | 1.01 | 0.00 |
| 10 | MAZ | Zn | 6.36 | 26.4 | 0.0 | 5.48 | 4.85 | 3.99 | 3.03 | 0.77 | 0.24 |
| | *MAZ | Zn | 6.90 | 29.4 | 0.0 | 4.31 | 0.11 | 4.09 | 4.07 | 0.73 | 0.01 |
| 11 | MAZ | Fe | 3.66 | 27.8 | 0.0 | 5.78 | 7.01 | 7.30 | 3.79 | 0.96 | 0.48 |
| | *MAZ | Fe | 4.60 | 34.9 | 0.0 | 3.07 | 2.56 | 7.29 | 5.74 | 0.62 | 0.21 |
| 12 | ECR-32 | Fe | 4.44 | 28.7 | 0.0 | 3.13 | 4.49 | 6.21 | 4.17 | 0.56 | 0.33 |
| | *ECR-32 | Fe | 4.38 | 31.2 | 0.0 | 3.32 | 0.31 | 6.84 | 6.62 | 0.86 | 0.03 |
| 13 | GME | Cr | 6.29 | 25.2 | 0.0 | 7.99 | 3.79 | 3.85 | 2.93 | 1.14 | 0.24 |
| | *GME | Cr | 7.45 | 26.7 | 0.0 | 6.27 | 1.06 | 3.44 | 3.21 | 0.92 | 0.07 |
| 14 | GME | Cr | 8.90 | 26.6 | 0.0 | 6.84 | 0.79 | 2.87 | 2.74 | 0.86 | 0.04 |
| | *GME | Cr | 7.80 | 26.3 | 0.0 | 6.28 | 0.25 | 3.24 | 3.19 | 0.93 | 0.02 |
| 15 | GME | Zn | 6.27 | 23.7 | 0.0 | 8.23 | 4.90 | 3.63 | 2.75 | 1.16 | 0.24 |
| | *GME | Zn | 6.98 | 27.6 | 0.0 | 5.58 | 0.04 | 3.80 | 3.79 | 0.94 | 0.00 |
| 16 | LTL | Zn | 3.61 | 24.9 | 12.0 | 0.00 | 8.03 | 6.63 | 3.45 | 1.20 | 0.48 |
| | *LTL | Zn | 5.00 | 32.8 | 4.8 | 0.58 | 0.19 | 6.30 | 6.20 | 0.79 | 0.02 |

The asterisk indicates that the material has undergone demetallation in accordance with the instant invention.

In all cases either essentially all, or most, of the transition metal is removed. After annealing a subsequent treatment the instant invention will remove the small residue of transition metal. The initial removal followed by annealing increases the stability of the framework.

EXAMPLE 17

Figure 2:
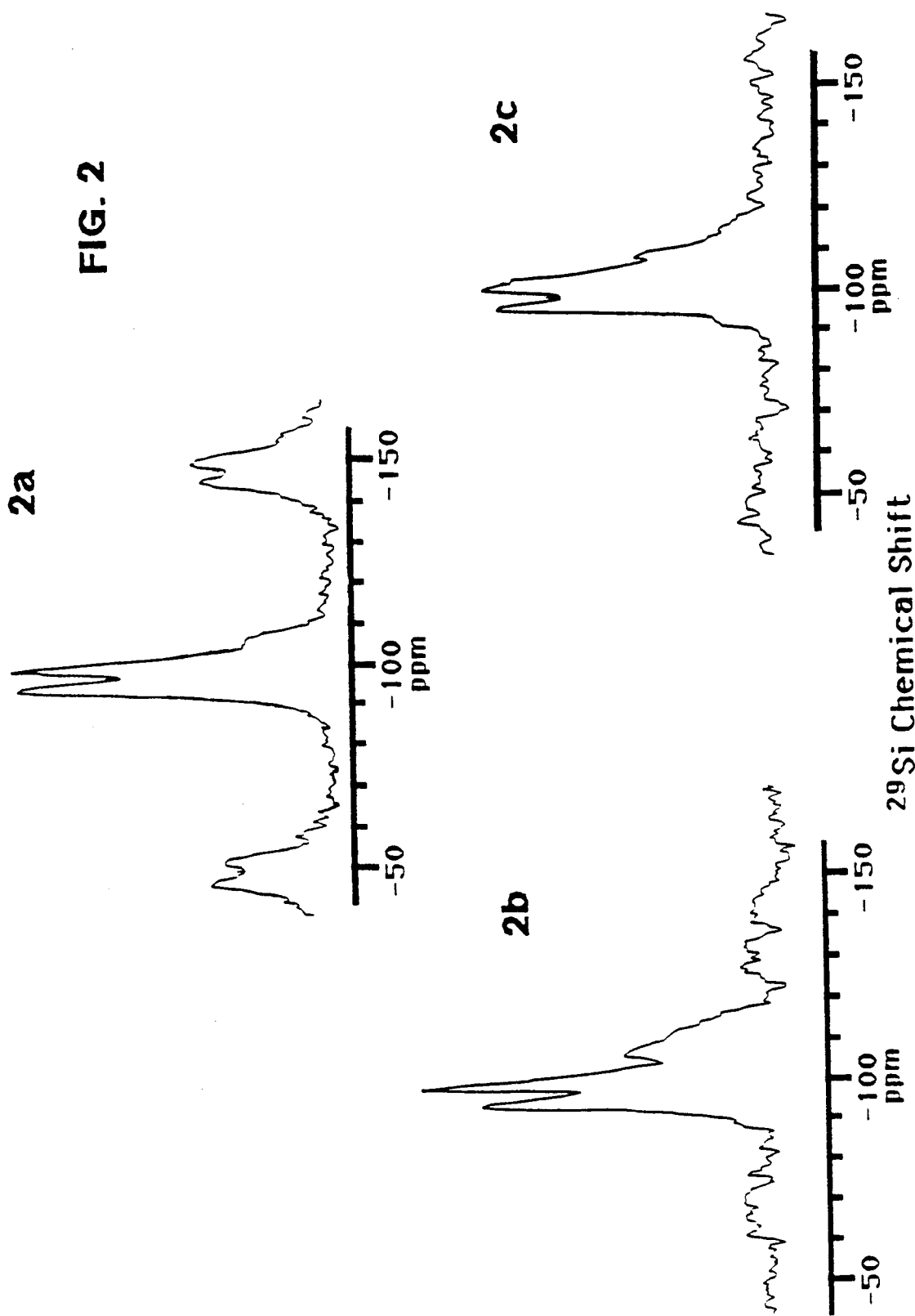
FIGS. 2a-c are the 29 Si- Magic Angle Spinning Nuclear Magnetic Resonance (MASNMR) spectra for ECR-22D (Ni-LTL), de-nickelated ECR-22D and the realuminated product of Example 17, respectively.

To demonstrate the ordered filling of lattice vacancies created by de-nickelation of the product of Example 5, a de-nickelated Ni-LTL (designated ECR-22D in co-pending U.S. Ser. No. 746,263), this product was "exchanged" with a solution of sodium aluminate. Thus, the ECR-22D of Example 5, having the $^{29}$Si-MASNMR spectrum shown in FIG. 2a, was de-nickelated according to the method of Example 5, producing an aluminosilicate LTL having the $^{29}$Si-MASNMNR spectrum shown in FIG. 2b. 2 gms of the latter were reacted with 10 cc solution of sodium aluminate containing 0.15 gm Al₂O₃, at 60° C. for 2 hours. The product was filtered, washed with distilled water, then calcined for 2 hours at 500° C. The $^{29}$Si-MASNMR spectrum of this re-aluminated material is shown in FIG. 2c. Apart from the sideband complexity caused by Ni in the structure, FIG. 2a has the same center of mass as FIG. 2c, indicating a similar Si/(Al+D) ratio. The center of mass of FIG. 2b is clearly showing a higher Si/(Al+D) ratio, confirming the D (in this case Ni) is first removed from the structure then the vacancies are filled with back exchanged Al.

EXAMPLE 18

Four 125 ml. acid digestion bombs (Teflon lined) were charged with 2.0 g. of Fe-FAU and 80 mls of a 5% solution of Na₂H₂EDTA. This bomb was mounted on a rotating shelf in a 200° C. oven for 8 hours. The product was filtered, washed and dried in an 115° C. oven. The very light tan product was analyzed by ICP-AES using Li$_2$B$_2$O$_7$/Li$_2$CO$_3$ fusion method to dissolve the sample, yielding the following results shown in Tables V and VI.

TABLE V

| Sample | % Al | % Si | % Na | % Fe | Si/Al + Fe | Fe/Al + FE |
|---|---|---|---|---|---|---|
| Fe-FAU | 5.40 | 24.7 | 7.42 | 5.91 | 2.87 | .35 |
| Fe-FAU* | 6.74 | 29.4 | 5.32 | .17 | 4.14 | .012 |

The asterisk indicates that the material has undergone demetallation in accordance with the instant invention.

Figure 3:
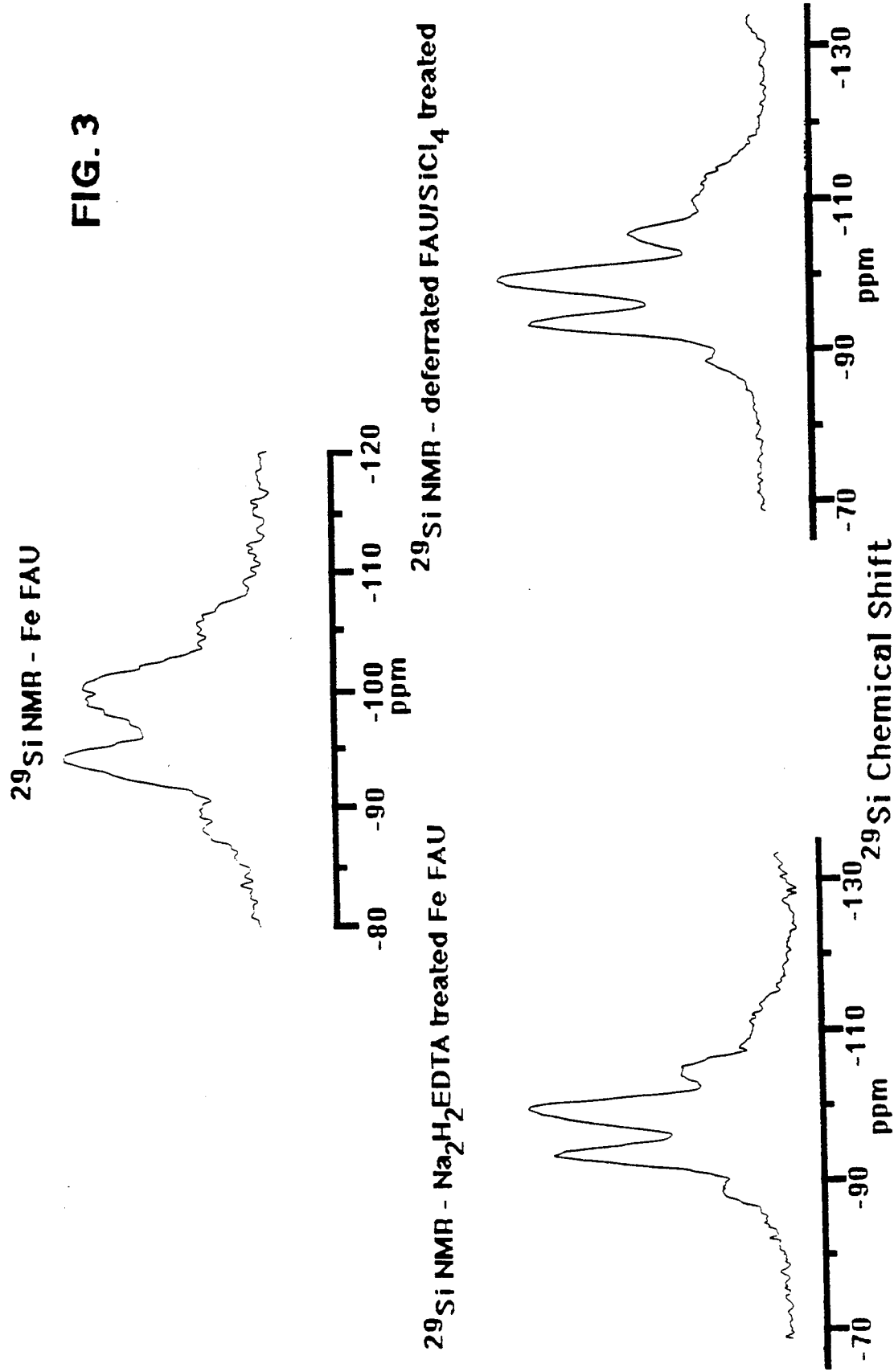
FIG. 3 shows a similar sequence of spectra for ferrifaujasite (Ferr-FAU), the deferrated form, and the resilicated product of Example 19.

The $^{29}$Si-MASNMR spectra are shown in FIG. 3 for the ferrisilicate FAU and the demetallated —FAU, showing a clear shift to higher Si/(Al+M) ratios in the later product.

EXAMPLE 19

The demetallated zeolite from Example 18 (2 grams) was calcined at 400° C. for 2 hours and then refluxed for four hours under dry nitrogen with a solution of 2.5 mls SiCl$_4$ in 125 mls carbon tetrachloride. The product was washed with carbon tetrachloride and dry ethanol, then analyzed by ICP-AES, giving the composition shown in Tables VI and VII. The $^{29}$Si-MASNMR spectra of this product is shown to have a higher Si/Al ratio compared to the starting material (FIG. 3).

EXAMPLE 20

The demetallated zeolite of Example 18 (2 gm) was calcined at 400° C. for 2 hours then refluxed for 4 hours under dry nitrogen with a solution of 2.5 mls of TiCl$_4$ in 125 ml carbon tetrachloride. The product was washed with carbon tetrachloride and dry ethanol, then analyzed by ICP-AES, giving the titano-aluminosilicate composition shown in Tables VI and VII.

TABLE VI

| | % Al | % Si | % Na | % Fe | % Ti | Si/(Al + Fe) |
|---|---|---|---|---|---|---|
| Example 19 | 7.06 | 33.4 | 5.07 | .19 | — | 4.49 |
| Example 20 | 7.25 | 31.8 | 5.18 | .17 | 1.02 | 4.17 |

The increase in Si/Al+Fe level in Example 19 and the uptake of titanium in Example 20 show that these elements fill the vacancy left by the removed transition metal.

TABLE VII

| Example | Zeolite | Treatment | Si Al + M | Fe Al + Fe | Unit Cell A |
|---|---|---|---|---|---|
| 18 | Fe-FAU | None | 2.87 | .35 | 24.647 |
| 18 | Fe-FAU* | Deferrated | 4.14 | .012 | 24.595 |
| 19 | | SiCl$_4$ | 4.49 | .013 | 24.598 |
| 20 | | TiCl$_4$ | 3.90 | .011 | 24.628 |
| 21 | | NaSilicate | 4.42 | .012 | 24.603 |

EXAMPLE 21

3 gm of the demetallated product of Example 18 were reacted with a solution of 1.3 gm waterglass solution (PQ Corp. N brand sodium silicate) dissolved in 30 gms H$_2$O for 24 hours at 100° C. The product was washed with water, dried at 110° C. then analyzed using ICP-AES, having the increased Si/Al ratio given in Table VII.

What is claimed is:

1. A method for demetallating crystalline molecular sieve materials comprising the steps of:
    (a) obtaining a crystalline molecular sieve material having framework cation positions wherein a transition metal is contained in said framework cation positions.
    (b) removing said transition metal from said framework cation positions of said crystalline molecular sieve material by contacting said transition metal containing crystalline molecular sieve material with a complexing agent having a pH above about 3 at a temperature of about 0° to about 300° C. to remove said transition metal from said crystalline molecular sieve material
    (c) annealing said crystalline molecular sieve material having said transition metal removed therefrom wherein said annealing comprises solution phase annealing, vapor phase annealing, thermal annealing, hydrothermal annealing and combinations thereof.

2. A method according to claim 1 further comprising adding to said annealing step (c) a compound having a cation selected from the group consisting of silicon, zirconium, titanium, aluminum, boron, gallium, germanium, phosphorus, vanadium, manganese and mixture thereof.

3. A method according to claim wherein said transition metal containing materials are selected from the group consisting of zeolites, zeolitic materials, metal alumino-phosphates, metal silico-alumino phosphates, metallo silicates, metal-stanno silicates, titano-silicates, zircono-silicates, and mixtures thereof.

4. A method according to claim 1 wherein said solution annealing is conducted using solutions selected from the group of aqueous and non-aqueous solutions of silicon, aluminum, phosphorus, zirconium, titanium, germanium, boron, gallium, vanadium, manganese and mixtures thereof 5. A method according to claim 2 wherein said compound having a silicon cation is selected from the group consisting of silicon tetrachloride, tetramethylorthosiliane, tetraethylorthosilane, and mixtures thereof.

6. A method according to claim 2 wherein said compound having a titanium cation is selected form the group consisting of titanium isopropoxide and tetramethyltitanate.

7. A method according to claim I wherein said transition metals of said transition metal containing crystalline material are selected from the elements of the 4th Period of the Periodic Table including V, Cr, Mn, Fe, Co, Ni, Cu, Zn, and mixtures thereof.

8. A method of claim 1 wherein said framework transition metal is iron, zinc or mixtures thereof.

* * * * *